United States Patent
Yamada et al.

(10) Patent No.: US 10,680,257 B2
(45) Date of Patent: Jun. 9, 2020

(54) FUEL CELL SYSTEM AND CONTROL METHOD FOR FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Hiroyuki Imanishi, Toyota (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 635 days.

(21) Appl. No.: 14/925,493

(22) Filed: Oct. 28, 2015

(65) Prior Publication Data
US 2016/0141647 A1    May 19, 2016

(30) Foreign Application Priority Data
Nov. 14, 2014    (JP) .................. 2014-232059

(51) Int. Cl.
*H01M 8/04* (2016.01)
*H01M 8/04007* (2016.01)
(Continued)

(52) U.S. Cl.
CPC ... *H01M 8/04037* (2013.01); *H01M 8/04029* (2013.01); *H01M 8/04074* (2013.01);
(Continued)

(58) Field of Classification Search
CPC ......... H01M 8/04037; H01M 8/04029; H01M 8/04074; H01M 8/0473
See application file for complete search history.

(56) References Cited

U.S. PATENT DOCUMENTS

| 4,720,623 A | 1/1988 | DiCesare et al. |
|---|---|---|
| 2012/0122000 A1 | 5/2012 | Lee et al. |

(Continued)

FOREIGN PATENT DOCUMENTS

| JP | 2005-100752 A | 4/2005 |
|---|---|---|
| JP | 2011-134443 A | 7/2011 |

(Continued)

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

The present invention is to prevent the temperature of an electric heater from being higher than or equal to a temperature at which control to reduce power consumption is started to prevent an abrupt decrease in the power consumption of the electric heater in order to secure a power consuming destination of a fuel cell. A fuel cell system 10 includes: a fuel cell 20 that receives the supply of reactant gas to generate power; a fuel cell cooling system 30 for circulating a coolant through the fuel cell 20 to cool the fuel cell 20; an electric heater 40 operated to consume power of the fuel cell 20 and driven to decrease power consumption abruptly at a temperature lower than a decomposition temperature of the coolant; and a heater cooling system 50 for circulating the coolant around the electric heater 40 to cool the electric heater 40. In a control method therefor, when the temperature of the coolant in the heater cooling system 50 falls within a temperature range where the power consumption of the electric heater 40 changes abruptly, the coolant is circulated from the fuel cell cooling system 30 into the heater cooling system 50 to cool the electric heater 40.

8 Claims, 5 Drawing Sheets

(51) Int. Cl.
*H01M 8/04029* (2016.01)
*H01M 8/0432* (2016.01)
*H01M 8/04701* (2016.01)

(52) U.S. Cl.
CPC ... *H01M 8/04358* (2013.01); *H01M 8/04373* (2013.01); *H01M 8/04723* (2013.01); *H01M 8/04738* (2013.01); *H01M 8/04731* (2013.01); *H01M 2250/20* (2013.01); *Y02T 90/32* (2013.01)

(56) References Cited

U.S. PATENT DOCUMENTS

2015/0053491 A1* 2/2015 Tang .................. H01M 8/04
180/65.31
2015/0280262 A1 10/2015 Hoshi

FOREIGN PATENT DOCUMENTS

| | | |
|---|---|---|
| JP | 2011-189864 | 9/2011 |
| JP | 2012-195263 | 10/2012 |
| JP | 2013-99081 | 5/2013 |
| WO | WO2014/054560 A1 | 4/2014 |

\* cited by examiner

FUEL CELL SYSTEM AND CONTROL METHOD FOR FUEL CELL SYSTEM

BACKGROUND OF THE INVENTION

1. Field of the Invention

The present invention relates to a fuel cell system and a control method for a fuel cell system for operating an electric heater to consume power of a fuel cell.

2. Background Art

A fuel cell system is a power generation system which oxidizes fuel by an electrochemical process to directly convert, into electric energy, energy discharged with the oxidizing reaction. A fuel cell stack has a membrane electrode assembly in which both side surfaces of a polymer electrolyte membrane for selectively transporting hydrogen ions are sandwiched and held by a pair of electrodes made of a porous material. Each of the pair of electrodes has a catalyst layer which has, as a main component, carbon powder which carries a platinum-based metal catalyst and comes in contact with the polymer electrolyte membrane, and a gas diffusion layer formed on the surface of the catalyst layer and having both air permeability and electron conductivity.

A fuel cell vehicle with a fuel cell system mounted as a power source runs by driving a traction motor by electricity generated by a fuel cell. The fuel cell vehicle includes an electric heater to operate the electric heater in order to consume surplus power of the fuel cell. As a technique related to the fuel cell vehicle including the electric heater, for example, a control method for a fuel cell system is disclosed (see Patent Document 1), which operates an electric heater to consume surplus power of a fuel cell, wherein cooling water circulating through the electric heater is bypassed from a cooling water passage of the fuel cell so that temperature will be lower than or equal to a decomposition temperature of the cooling water.

CITATION LIST

Patent Document

[Patent Document 1] JP 2013-099081 A

SUMMARY OF THE INVENTION

When the heater temperature becomes high, the electrical resistance of the electric heater increases with increased temperature to reduce power consumption therewith. However, when the temperature of the cooling water becomes excessively high, this has an undesirable effect on associated parts (e.g., electric heater, heater core, etc.). To deal with such an effect, depending on the fuel cell system, power to be supplied to the electric heater is aggressively suppressed in a range of temperatures not lower than a predetermined set temperature to cause the power consumption of the electric heater to decrease abruptly in order to protect the associated parts. However, in the control method for the fuel cell system disclosed in Patent Document 1, the temperature of a coolant is controlled to be 100° C. or lower as the decomposition temperature of cooling water. In this case, when the temperature of the cooling water is controlled to reduce the power consumption of the electric heater aggressively in a range of temperatures lower than the decomposition temperature, surplus power caused by regenerative operation or power generated during warming-up operation of the fuel cell cannot be sufficiently consumed by the electric heater in the temperature range, and hence there is a possibility that a power consuming destination cannot be secured.

The present invention has been devised in view of the above circumstances, and an object thereof to provide a fuel cell system and a control method for a fuel cell system, capable of preventing an electric heater from being driven in a temperature range where power consumption decreases abruptly to secure a power consuming destination of a fuel cell.

In order to attain the above object, the fuel cell system according to the present invention is a fuel cell system for operating an electric heater to consume surplus power of a fuel cell, the fuel cell system comprising: the fuel cell that receives the supply of reactant gas to generate power; a fuel cell cooling system for circulating a coolant through the fuel cell to cool the fuel cell; an electric heater operated to consume power of the fuel cell and driven to decrease power consumption abruptly at a temperature lower than a decomposition temperature of the coolant around the electric heater; a heater cooling system for circulating the coolant around the electric heater to cool the electric heater; and a controller that controls the fuel cell system, wherein the controller is programmed to perform circulating the coolant from the fuel cell cooling system into the heater cooling system to cool the electric heater, when the temperature of the coolant in the heater cooling system falls within a temperature range where the power consumption of the electric heater changes abruptly. The control method for the fuel cell system according to the present invention is a control method for a fuel cell system for operating an electric heater to consume surplus power of a fuel cell, the fuel cell system including: the fuel cell that receives the supply of reactant gas to generate power; a fuel cell cooling system for circulating a coolant through the fuel cell to cool the fuel cell; an electric heater operated to consume power of the fuel cell and driven to decrease power consumption abruptly at a temperature lower than a decomposition temperature of the coolant around the electric heater; and a heater cooling system for circulating the coolant around the electric heater to cool the electric heater, wherein when the temperature of the coolant in the heater cooling system falls within a temperature range where the power consumption of the electric heater changes abruptly, the coolant is circulated from the fuel cell cooling system into the heater cooling system to cool the electric heater.

Here, the "temperature range where power consumption changes abruptly" means a temperature range in which control is performed to reduce the power consumption aggressively beyond a natural decrease in the power consumption of the electric heater with increased temperature.

In the present invention, when the temperature of the coolant in the heater cooling system versus the temperature of the coolant in the fuel cell cooling system is higher than or equal to a predetermined value (e.g., set temperature Ts at which control to reduce the power consumption of the electric heater is started), it is preferred to circulate the coolant from the fuel cell cooling system into the heater cooling system so as to cool the electric heater.

In the present invention, when the temperature of the coolant in the heater cooling system is lower than or equal to a predetermined value (e.g., lower limit temperature TL1), it is preferred to shut down the circulation of the coolant from the fuel cell cooling system into the heater cooling system.

In the present invention, when the heater coolant temperature versus the temperature of the coolant in the fuel cell cooling system falls beyond a range of a predetermined value (e.g., first temperature difference ΔT1), it is preferred to circulate the coolant from the fuel cell cooling system into the heater cooling system so as to cool the electric heater.

In the present invention, when the temperature of the coolant in the heater cooling system versus the temperature of the coolant in the fuel cell cooling system falls within a range of a predetermined value (e.g., second temperature difference ΔT2), it is preferred to shut down the circulation of the coolant from the fuel cell cooling system to the heater cooling system.

In the present invention, when the electric heater is driven for air conditioning and the temperature of the coolant in the heater cooling system is higher than or equal to a predetermined value (e.g., set temperature Ts), it is preferred to circulate the coolant from the fuel cell cooling system into the heater cooling system so as to cool the electric heater.

According to the present invention, when the temperature of the coolant around the electric heater falls within a temperature range where the power consumption of the electric heater changes abruptly, the coolant is circulated from the fuel cell cooling system into the heater cooling system to cool the electric heater. Therefore, the electric heater can be prevented from being driven in a temperature range where the power consumption abruptly decreases to secure a power consuming destination of the fuel cell.

DESCRIPTION OF THE PREFERRED EMBODIMENT

Figure 1:
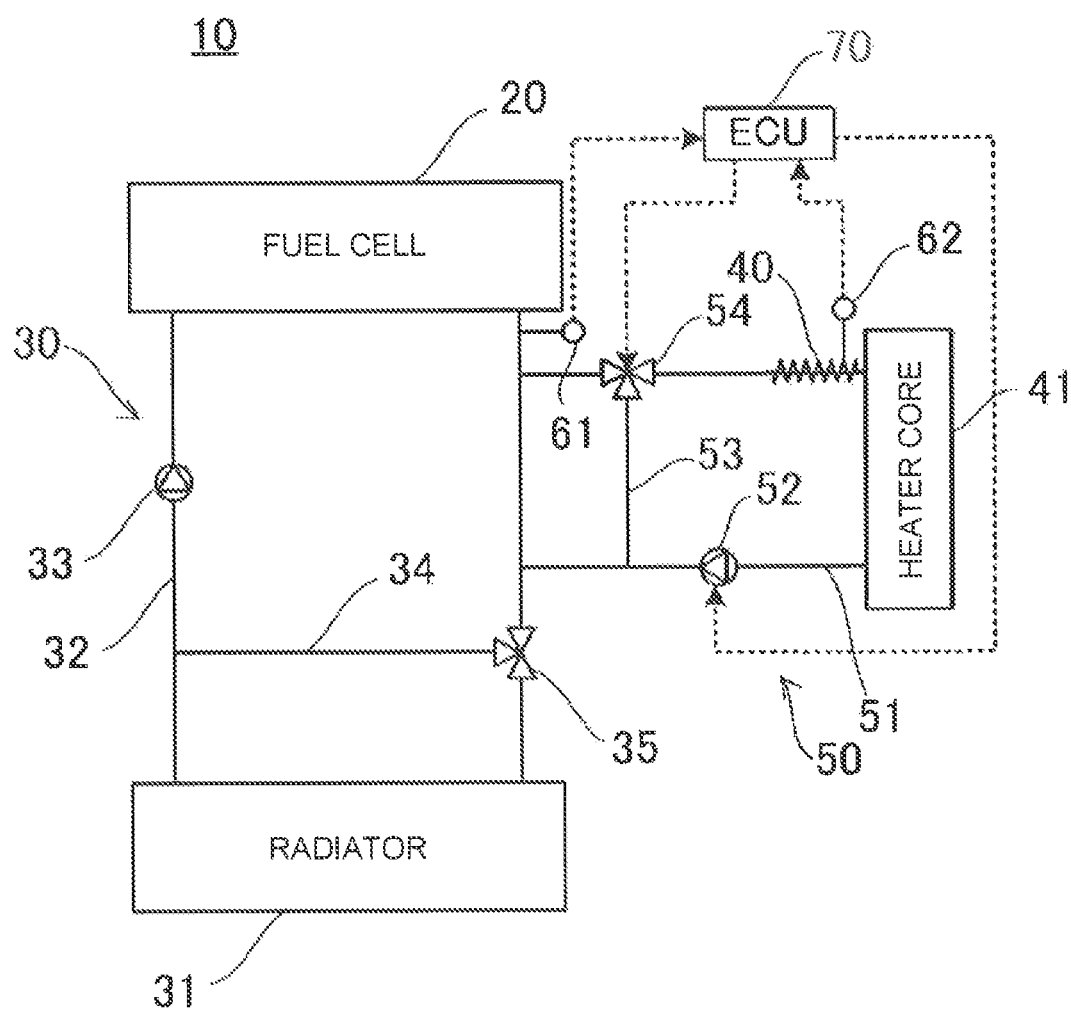
FIG. 1 is a block diagram of a fuel cell system in an embodiment of the present invention.

An embodiment of the present invention will be described below. In the following description of the drawings, the same or similar parts are denoted by the same or similar reference numerals. However, the drawings are schematic representations. Therefore, specific dimensions and the like should be determined in the light of the following description. Further, it is needless to say that respective drawings can contain differences in dimensional relationship or ratio from one another.

<System Configuration>

Referring first to FIG. 1, a fuel cell system to which a control method according to the embodiment of the present invention is applied will be described. FIG. 1 is a block diagram of the fuel cell system in the embodiment of the present invention. As shown in FIG. 1, a fuel cell system 10 functions as an in-vehicle power system mounted in a fuel cell vehicle, and includes, as main components, a fuel cell 20, a fuel cell cooling system 30, an electric heater 40, a heater cooling system 50, temperature sensors 61, 62, and a controller 70.

The fuel cell 20 oxidizes hydrogen as fuel gas by an electrochemical process to directly convert, into electric energy, energy discharged with the oxidizing reaction. The fuel cell vehicle (not shown) in which the fuel cell system 10 is mounted as a power source runs by driving a traction motor by electricity generated by the fuel cell 20.

The fuel cell 20 is made up of a stack structure in which multiple cells are stacked (the stack structure may also be called the fuel cell stack below). For example, each of the cells of a solid polymer electrolyte fuel cell includes: at least a membrane electrode assembly (MEA), composed of an ion-permeable electrolyte membrane, and an anode-side catalyst layer (electrode layer) and a cathode-side catalyst layer (electrode layer) that sandwich the electrolyte membrane; and a gas diffusion layer for supplying fuel gas or oxidant gas to the membrane electrode assembly. Each of the cells is sandwiched between a pair of separators.

The fuel cell cooling system 30 is a circulatory system for circulating a coolant through the fuel cell stack 20 to cool the fuel cell stack 20. Specifically, the fuel cell cooling system 30 includes a radiator 31, a circulating flow path 32, a pump 33, a shunt flow path 34, and a three-way valve 35. A temperature sensor 61 is provided near a coolant outlet of the fuel cell stack 20 to measure the internal temperature (fuel cell water temperature Tf) of the fuel cell stack 20.

The coolant is a circulatory medium for cooling the fuel cell stack 20 and the electric heater 40, which is, for example, an ethylene glycol aqueous solution. When the ethylene glycol aqueous solution is used as cooling water, it is decomposed at a decomposition temperature or higher in the presence of oxygen to generate organic acids such as formic acid. These organic acids are ionized in the cooling water to increase the electrical conductivity of the cooling water. Therefore, it is preferred to control at least the temperature of the coolant within the decomposition temperature.

The radiator 31 is generally composed of a tube, a radiating fin, and a fan (all of which are not shown). The radiator 31 is a radiator device for performing heat exchange by the coolant flowing through the tube, having the function of lowering, by heat exchange, the temperature of the coolant passing through. The circulating flow path 32 is a tubular flow path for circulating the coolant between the radiator 31 and the fuel cell stack 20. The pump 33 is interposed in the circulating flow path 32 on the inlet side of the fuel cell stack 20 to serve as drive means for transporting the coolant to the fuel cell stack 20. The shunt flow path 34 is a flow path for connecting the inlet side and the outlet side of the fuel cell stack 20 in the circulating flow path 32 to pass the coolant through when the coolant is not cooled by the radiator 31. The three-way valve 35 is interposed in a bifurcation area of the shunt flow path 34 on the outlet side of the fuel cell stack 20 in the circulating flow path 32 to serve to switch between the circulating flow path 32 and the shunt flow path 34.

The electric heater 40 is operated to consume power of the fuel cell stack 20. By its nature, the electric heater 40 gradually increases electrical resistance with increased ambient temperature to reduce power consumption therewith. However, when the temperature of the coolant becomes excessively high, this has an undesirable effect on associated parts (e.g., electric heater 40, heater core 41, etc.). To deal with such an effect, in the fuel cell system of the embodiment, power to be supplied to the electric heater 40 is aggressively suppressed in a range of temperatures not lower than a predetermined set temperature (e.g., 85° C. when the coolant is water) lower than the decomposition temperature of the coolant (e.g., 100° C. when the coolant is water) to perform control to cause the power consumption of the electric heater 40 to decrease abruptly. The electric heater 40 includes a heater core 41 functioning as a small radiator to be described below. The heater core 41 is combined with an evaporator to constitute, for example, an in-vehicle air conditioner. Cases where the electric heater 40 is operated to consume power include a case where surplus power is generated due to regenerative operation, a case where power is generated to warm up the fuel cell stack 20, and the like.

The heater cooling system 50 is a cooling system for circulating the coolant around the electric heater 40 and through the heater core 41 to cool the electric heater 40. The heater cooling system 50 includes the heater core 41, a bypass flow path 51, a pump 52, a shunt flow path 53, and a three-way valve 54.

The heater core 41 is generally composed of a tube, a radiating fin, and a fan (all of which are not shown). The heater core 41 is a radiator device for performing heat exchange by the coolant flowing through the tube. The bypass flow path 51 is a flow path for diverting the coolant to the vicinity of the electric heater 40 and to the heater core 41 on the outlet side of the fuel cell stack 20. When the three-way valve 54 is switched to connect the fuel cell cooling system 30 to this heater cooling system, the coolant passes through the vicinity of the electric heater 40 to cool the electric heater 40 indirectly. The pump 52 is interposed in the bypass flow path 51 on the outlet side of the heater core 41 to serve to circulate the coolant in the heater cooling system 50. The shunt flow path 53 is a flow path for connecting the inlet side and the outlet side of the heater core 41 in the bypass flow path 51. The three-way valve 54 is interposed in a bifurcation area of the shunt flow path 53 on the inlet side of the heater core 41 in the bypass flow path 51 to serve to switch between the bypass flow path 51 and the shunt flow path 53.

The temperature sensor 61 is provided in the circulating flow path 32 on the outlet side of the fuel cell stack 20 to detect the outlet temperature of the fuel cell stack 20 (the coolant temperature in the fuel cell cooling system 30, which is roughly the same as the internal temperature of the fuel cell stack 20 and hence is called "fuel cell water temperature"). On the other hand, the temperature sensor 62 is provided in the bypass flow path 51 near the electric heater 40 to detect the temperature of the coolant circulated around the electric heater 40 (the coolant temperature in the heater cooling system 50, which is roughly the same as the temperature of the electric heater 40 and hence is called "heater water temperature"). The temperature sensors 61, 62 are electrically connected to the controller 70, and the detected temperatures of the temperature sensors 61, 62 are input to the controller 70 as electrical signals.

Based on the detected signals of the temperature sensors 61, 62, the controller 70 controls the pump 52 and the three-way valve 54 in the bypass flow path 51. The controller 70 is, for example, an electronic control unit (ECU). The ECU 70 includes, for example, a CPU, a ROM, a RAM, and an I/O interface to execute a predetermined software program in order to carry out the control method according to the present invention in the fuel cell system.

<Control Method>

Referring next to FIG. 1 to FIG. 5, the control method for the fuel cell system according to the embodiment of the present invention will be described.

As shown in FIG. 1, the fuel cell vehicle with the fuel cell system 10 mounted therein runs by driving the traction motor by electricity generated by the fuel cell stack 20. The fuel cell vehicle includes the electric heater 40, and the electric heater 40 is operated to consume surplus power of the fuel cell stack 20.

Figure 5:
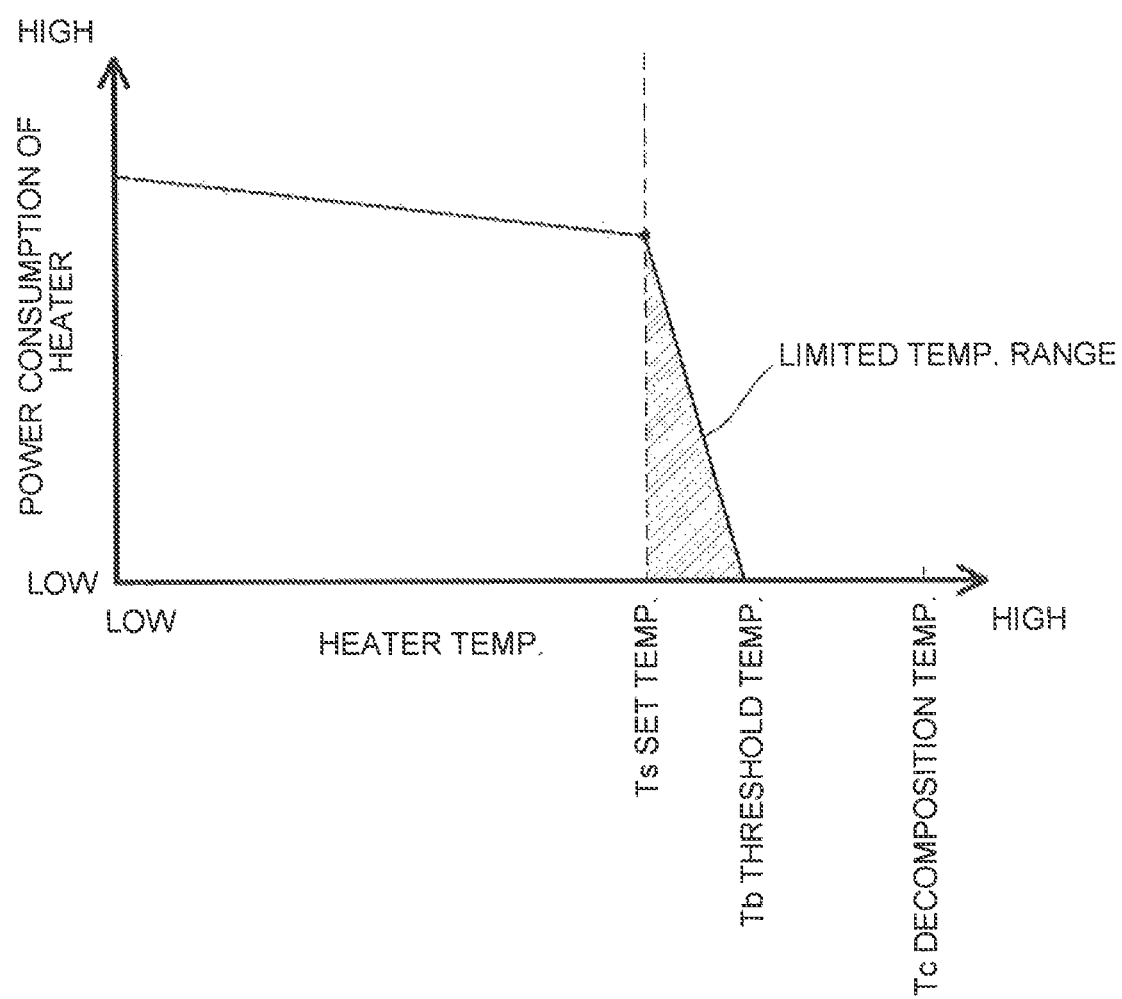
FIG. 5 is a chart used to describe a relationship between the power consumption of an electric heater and temperature.

FIG. 5 shows a relationship between the power consumption of the electric heater 40 and ambient temperature. As shown in FIG. 5, since the electrical resistance of the electric heater 40 gradually increases as the temperature of the electric heater 40 increases, the power consumption of the electric heater 40 gradually decreases. When the temperature of the electric heater 40 further increases, there is a need to reduce the consumed power of the electric heater 40 quickly in order to protect the electric heater 40 and the heater core 41. Specifically, there is a need to reduce the output of the electric heater 40 abruptly when the heater temperature reaches the predetermined set temperature Ts (e.g., 85° C.) in order to protect the electric heater 40 and the heater core 41 positively. The change rate for reducing the output of the electric heater 40 is large to an appreciable extent compared with the change rate in a range of temperatures not higher than the set temperature Tc, which is an abrupt change rate of about several hundred W/° C. Then, when the heater temperature reaches a predetermined threshold temperature Tb (e.g., 90° C.), the power supply to the electric heater 40 is shut down so that the output of the electric heater 40 will substantially become zero in order to protect the electric heater 40 and the heater core 41 securely. In other words, when the temperature of the electric heater 40 comes within a range of limited temperatures not lower than the set temperature Ts, since the output of the electric heater 40 is limited, the ability of the electric heater 40 to consume surplus power generated in the fuel cell system is reduced drastically in this limited temperature range. This leads to a reduction in power consumption, such as a decrease in regenerative braking power or a decline in rapid warm-up/heat retention control at a power consuming destination (i.e., a decrease in the amount of power generation/heat generation).

Therefore, in the fuel cell system 10 including the fuel cell stack 20 that receives the supply of reactant gas to generate power, the fuel cell cooling system 30 for circulating the coolant through the fuel cell stack 20 to cool the fuel cell stack 20, the electric heater 40 operated to consume the power of the fuel cell stack 20 and driven to decrease the power consumption abruptly at a temperature lower than the decomposition temperature of the coolant, and the heater cooling system 50 for circulating the coolant around the electric heater 40 to cool the electric heater 40, the control method for the fuel cell system according to the embodiment performs control to circulate the coolant from the fuel cell cooling system 30 into the heater cooling system 50 so as to cool the electric heater 40 when the temperature of the coolant in the heater cooling system 50 falls within a temperature range (a limited temperature range in FIG. 5) where the power consumption of the electric heater 40 changes abruptly.

<Specific Operation>

Figure 2:
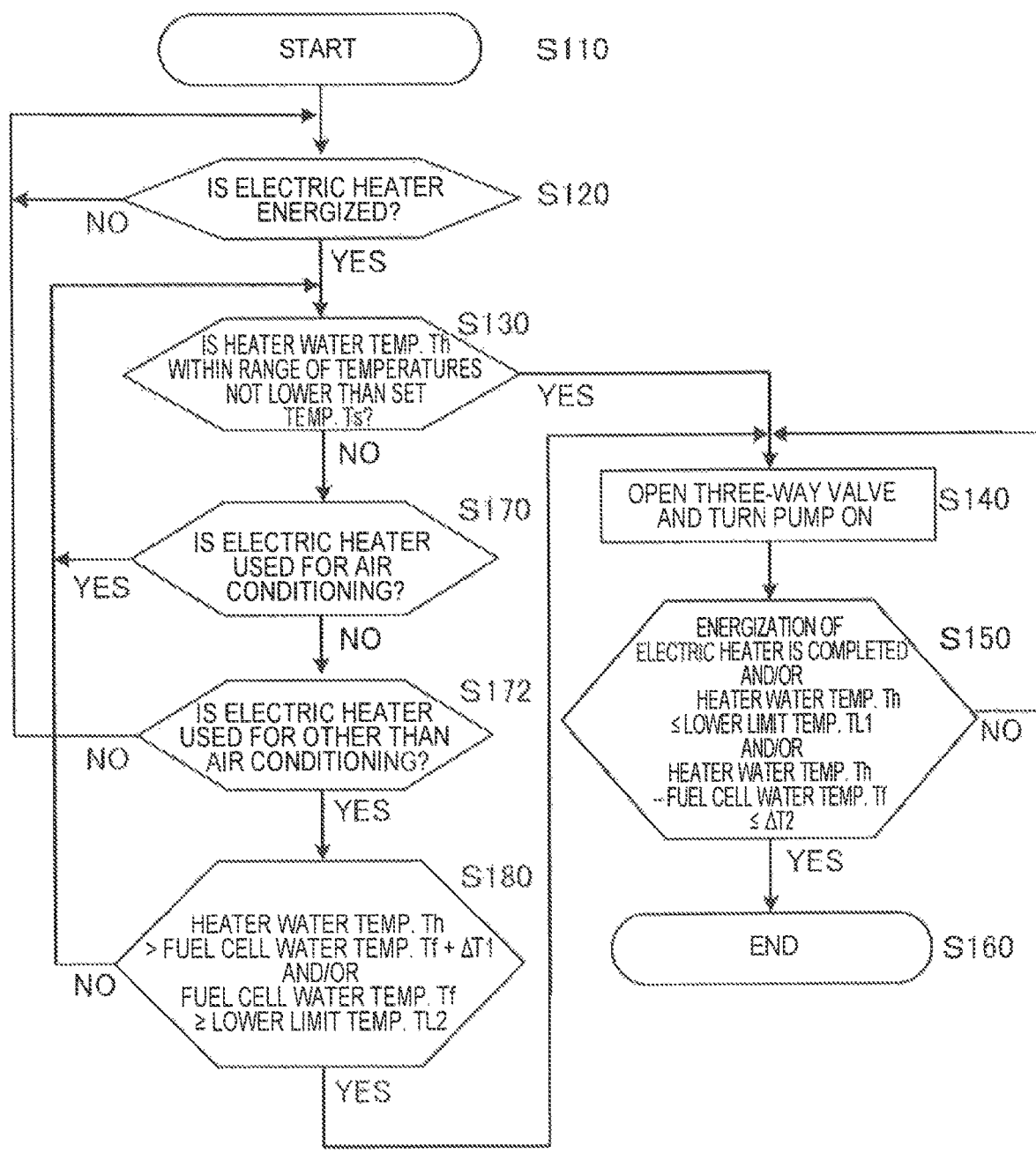
FIG. 2 is a flowchart of a control method for the fuel cell system according to the embodiment of the present invention.
Figure 3:
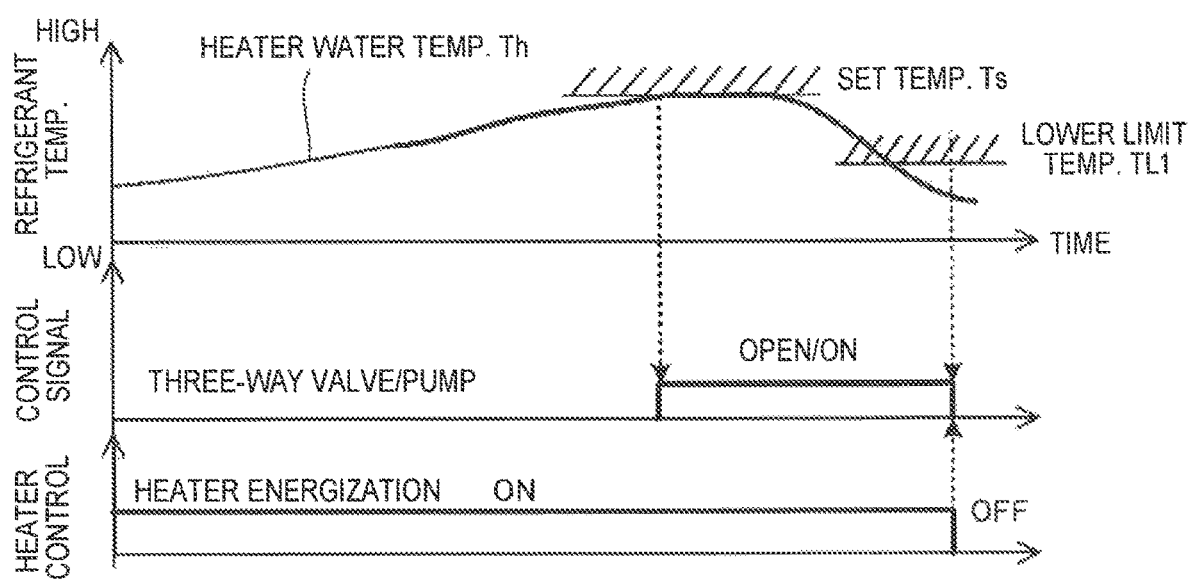
FIG. 3 is a chart used to describe the control method for the fuel cell system according to the embodiment of the present invention.
Figure 4:
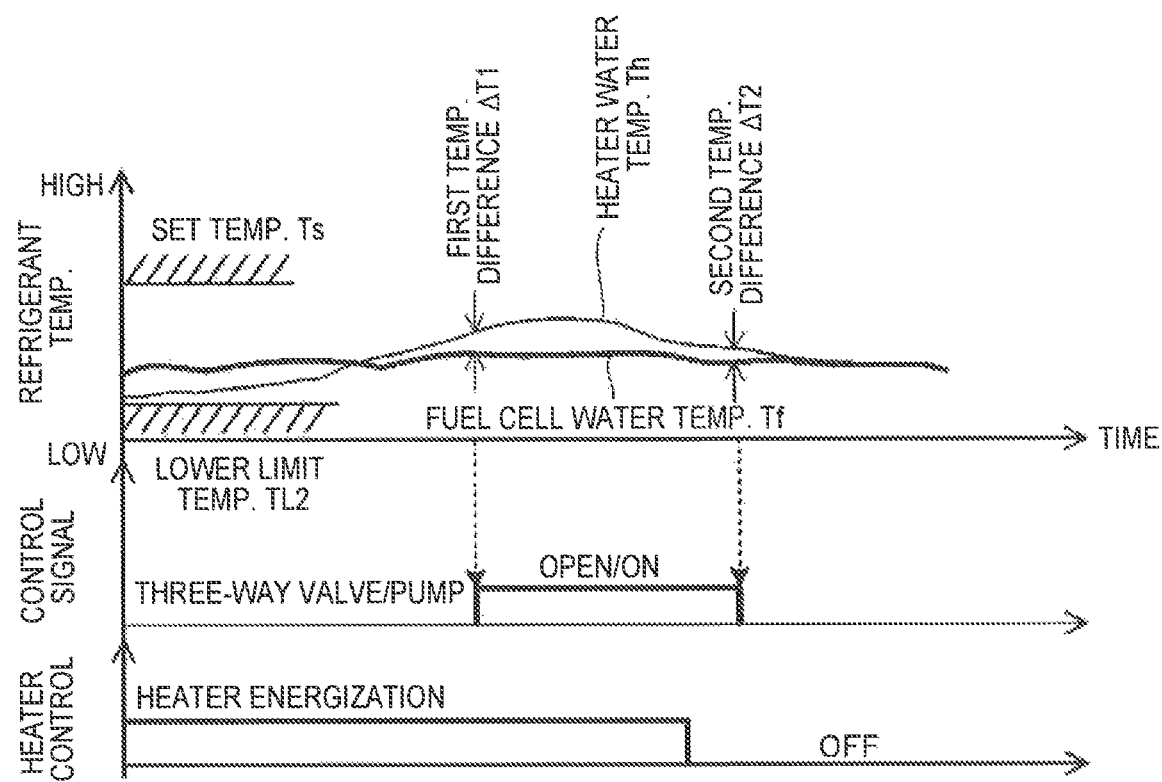
FIG. 4 is a chart used to describe the control method for the fuel cell system according to the embodiment of the present invention.

Referring to FIG. 1 to FIG. 4, the control method for the fuel cell system according to the embodiment will be specifically described below. FIG. 2 is a flowchart of the control method for the fuel cell system according to the embodiment of the present invention. FIG. 3 and FIG. 4 are charts used to describe the control method for the fuel cell system according to the embodiment of the present invention.

First, as shown in FIG. 2, when the operation of the fuel cell system 10 is started (S110), the ECU 70 monitors coolant temperature (fuel cell water temperature Tf) at the outlet of the fuel cell stack 20 and temperature (heater water temperature Th) around the electric heater 40. Next, the ECU 70 determines whether the electric heater 40 is energized (S120). When determining that the electric heater 40 is not energized (S120: NO), the ECU 70 continues to monitor the energization of the electric heater 40. On the other hand, when determining that the electric heater 40 is energized (S120: YES), the ECU 70 monitors whether water temperature (heater water temperature Th) around the electric heater 40 falls within a range of temperatures not lower than the set temperature (S130). In the embodiment, the set temperature is a set temperature Ts (e.g., 85° C.) shown in FIG. 3, and the temperature range is a temperature range where control is performed to reduce power consumption aggressively beyond a natural decrease in the power consumption of the electric heater 40 with increased temperature, which is, for example, the limited temperature range shown in FIG. 5.

Next, when it is determined that the water temperature (heater water temperature Th) around the electric heater 40 falls within the range of temperatures not lower than the set temperature Ts (S130: YES), the coolant is circulated from the fuel cell cooling system 30 into the heater cooling system 50 to cool the electric heater 40. Specifically, the ECU 70 controls the three-way valve 54 to release the bypass flow path 51 and turn the pump 52 on (S140). Though not shown in FIG. 2, since the ECU 70 monitors the coolant temperature at the outlet of the fuel cell stack 20, the three-way valve 54 is closed and the pump 52 is turned off when the water temperature of the fuel cell stack 20 is higher than the water temperature around the electric heater 40. For example, when the temperature of the coolant in the fuel cell stack 20 is close to the decomposition temperature (e.g., 97° C.), the three-way valve 54 is closed to turn the pump 52 off because it is impossible to cool the electric heater 40 and in order to protect the electric heater 40 and the heater core 41.

Next, the ECU 70 monitors whether the energization of the electric heater is completed, and/or whether the temperature of the coolant (heater water temperature Th) circulated around the electric heater 40 is lower than or equal to a lower limit temperature TL1 (e.g., 65° C.), and/or whether a difference between the temperature of the coolant (heater water temperature Th) circulated around the electric heater 40 and the coolant temperature (fuel cell water temperature Tf) at the outlet of the fuel cell stack 20 falls within a range of a predetermined value (second temperature difference ΔT2, e.g., 3° C.) (S150). When determining that the energization of the electric heater is not completed, and/or that the heater water temperature Th is higher than the lower limit temperature TL1, and/or that the difference between the heater water temperature Th and the fuel cell water temperature Tf falls beyond the range of the second temperature difference ΔT2 (S150: NO), the ECU 70 continues monitoring in step 150 (S150). On the other hand, when it is determined that the energization of the electric heater is completed, and/or that the heater water temperature Th is lower than or equal to the lower limit temperature TL1, and/or that the difference between the heater water temperature Th and the fuel cell water temperature Tf is within the range of the second temperature difference ΔT2 (S150: YES), the three-way valve 54 is closed and the pump 52 is turned off to complete the control (S160). This is because, when the electric heater 40 goes out of use or when the temperature of the electric heater 40 sufficiently decreases compared with the set temperature Ts, there is no possibility of an abrupt decrease in power consumption by the electric heater 40. This is also because, when there is no longer a big temperature difference between the temperature of the electric heater 40 and the temperature of the fuel cell stack 20, the cooling capability of the fuel cell cooling system 30 by the coolant is determined to become low, and hence the effectiveness of the supply of the coolant from the fuel cell cooling system 30 to the heater cooling system 50 is low. Note that cooling in the heater cooling system 50 is completed when the pump 52 is stopped. Therefore, it is not necessarily required to close the three-way valve 54, and the three-way valve 54 may remain opened. This is because durability can be improved if the unnecessary valve operation is not performed.

Further, when determining in step S130 that the water temperature around the electric heater 40 is lower than a predetermined value (set temperature Ts) (S130: NO), the ECU 70 monitors whether the electric heater 40 is used for air conditioning such as heating in the vehicle (S170). When determining that the electric heater 40 is used for air conditioning (S170: YES), the ECU 70 continues monitoring in step 130 (S130). On the other hand, when determining that the electric heater 40 is not used for air conditioning (S170: NO), the ECU 70 further monitors whether the electric heater is used for other than air conditioning (S172). When determining that the electric heater 40 is not used for other than air conditioning (S172: NO), the ECU 70 continues monitoring in step 120 (S120). On the other hand, when determining that the electric heater 40 is used for other than air conditioning (S172: YES), the ECU 70 determines whether to circulate the coolant from the fuel cell cooling system 30 into the heater cooling system 50 based on the coolant temperature of the heater cooling system 50 (heater water temperature Th) and the coolant temperature of the fuel cell stack 20 (fuel cell water temperature Tf) (S180).

Specifically, as shown in FIG. 4, the ECU 70 monitors whether a difference between the heater water temperature Th and the fuel cell water temperature Tf falls within or beyond a range of a predetermined value (first temperature difference ΔT1, e.g., 10° C.), and/or whether the fuel cell water temperature Tf is higher than or equal to the lower limit temperature TL2 (e.g., 40° C.) (S180). When determining that the difference between the heater water temperature Th and the fuel cell water temperature Tf is smaller than the first temperature difference ΔT1, and/or that the fuel cell water temperature Tf is lower than the lower limit temperature TL2 (S180: NO), the ECU 70 continues monitoring in step 130 (S130). On the other hand, when determining that the difference between the heater water temperature Th and the fuel cell water temperature Tf is larger than or equal to the first temperature difference ΔT1, and/or that the fuel cell water temperature Tf is higher than or equal to the lower limit temperature TL2 (S180: YES), the ECU 70 circulates the coolant from the fuel cell cooling system 30 into the heater cooling system 50. Specifically, the ECU 70 controls the three-way valve 54 to release the bypass flow path 51 and turn the pump 52 on (S140). The reason why the three-way valve 54 is opened and the pump 52 is turned on when the water temperature of the fuel cell stack 20 is higher than or equal to the lower limit temperature TL2 is to prevent the deterioration of heating performance.

After that, the ECU 70 performs monitoring in step 150 as mentioned above. Then, when determining that the energization of the electric heater is not completed, and/or that the heater water temperature Th is higher than the lower limit temperature TL1, and/or that the difference between the heater water temperature Th and the fuel cell water temperature Th exceeds the second temperature difference ΔT2 (S150: NO), the ECU 70 continues monitoring in step 150 (S150). On the other hand, when determining that the energization of the electric heater is completed, and/or that the heater water temperature Th is lower than or equal to the lower limit temperature TL1, and/or that the difference between the heater water temperature Th and the fuel cell water temperature Tf falls within the range of the second temperature difference ΔT2, i.e., that the heater water temperature Th is considered to be nearly equivalent to the fuel cell water temperature Tf (S150: YES), the ECU 70 closes the three-way valve 54 and turns the pump 52 off to complete the control (S160). This is because, when the electric heater 40 is no longer used, the electric heater 40 has no longer the function of consuming power, or when the temperature of the electric heater 40 is sufficiently low or when the temperature of the electric heater 40 is equivalent to the temperature of the fuel cell stack 20, there is no possibility of an abrupt decrease in power consumption by the electric heater 40.

Effect of Embodiment

As described above, according to the control method for the fuel cell system of the embodiment, when the temperature of the coolant around the electric heater 40 falls within a temperature range where the electric heater 40 is driven to change its power consumption abruptly, the coolant is circulated from the fuel cell stack cooling system 30 into the vicinity of the electric heater 40. Further, when the electric heater 40 is not used for air conditioning such as heating in the vehicle, but is used for other than air conditioning, if the coolant temperature around the electric heater 40 versus the coolant temperature of the fuel cell stack 20 falls beyond a range of a predetermined value (first temperature difference ΔT1), the coolant is circulated from the fuel cell cooling system 30 into the heater cooling system 50 to cool the electric heater 40. Further, when the coolant temperature of the fuel cell stack 20 is higher than or equal to a predetermined value (lower limit temperature TL2), the coolant is circulated from the fuel cell cooling system 30 into the heater cooling system 50. Thus, the control method for the fuel cell system according to the embodiment prevents the temperature of the electric heater 40 from becoming high, and this can prevent an abrupt decrease in the power consumption of the electric heater 40, resulting in a beneficial effect that can secure a power consuming destination of the fuel cell stack 20.

Other Embodiments

Although the present invention has been described above in connection with the embodiment, it should not be understood that the description and the drawings that form part of this disclosure are intended to limit this invention. Various alternative embodiments, examples, and operating techniques will be obvious to those skilled in the art from this disclosure. For example, when the water temperature of the electric heater 40 is equivalent to the water temperature of the fuel cell stack 20 (e.g., within the second temperature difference ΔT2) and the water temperature of the electric heater 40 is higher than or equal to the set temperature Ts, control may be performed to set up the opening of the three-way valve 54 in the middle. This is to prevent the deterioration of heating performance, because there is no enough cooling performance due to no difference between the water temperature of the fuel cell cooling system 30 and the water temperature of the heater cooling system 50. Thus, it should be understood that the present invention can include various embodiments and the like that are not described here.

REFERENCE NUMERALS 10 fuel cell system
20 fuel cell
30 fuel cell cooling system
40 electric heater
50 heater cooling system

What is claimed is:

1. A fuel cell system for operating an electric heater to consume surplus power of a fuel cell, the fuel cell system comprising:
a fuel cell that receives supply of reactant gas to generate power;
a fuel cell cooling system configured to circulate a coolant through the fuel cell to cool the fuel cell;
an electric heater operated to consume power of the fuel cell;
a heater cooling system configured to circulate the coolant around the electric heater to cool the electric heater; and
a controller that is programmed to control the fuel cell system, wherein the controller is programmed to:
drive the electric heater to decrease power consumption by the electric heater abruptly when a temperature of the coolant in the heater cooling system is within a temperature range that is lower than a decomposition temperature of the coolant, and
perform circulating the coolant from the fuel cell cooling system into the heater cooling system to cool the electric heater when the temperature of the coolant in the heater cooling system falls within the temperature range that is lower than the decomposition temperature of the coolant.

2. The fuel cell system according to claim 1, wherein when the temperature of the coolant in the heater cooling system is higher than or equal to a predetermined value, the controller is programmed to perform circulating the coolant from the fuel cell cooling system into the heater cooling system to cool the electric heater.

3. The fuel cell system according to claim 2, wherein when the temperature of the coolant in the heater cooling system is lower than or equal to a second predetermined value, the controller is programmed to shut down the circulation of the coolant from the fuel cell cooling system into the heater cooling system.

4. The fuel cell system according to claim 1, wherein when a difference between the temperature of the coolant in the heater cooling system and the temperature of the coolant in the fuel cell cooling system falls outside of a predetermined range, the controller is programmed to perform circulating the coolant from the fuel cell cooling system into the heater cooling system to cool the electric heater.

5. The fuel cell system according to claim 4, wherein when the difference between the temperature of the coolant in the heater cooling system and the temperature of the coolant in the fuel cell cooling system falls within the predetermined range, the controller is programmed to shut down the circulation of the coolant from the fuel cell cooling system to the heater cooling system.

6. The fuel cell system according to claim 1, wherein when the electric heater is driven for air conditioning and the temperature of the coolant in the heater cooling system is higher than or equal to a predetermined value, the controller is programmed to perform circulating the coolant from the fuel cell cooling system into the heater cooling system to cool the electric heater.

7. A control method for a fuel cell system for operating an electric heater to consume surplus power of a fuel cell, the fuel cell system comprising:
   the fuel cell that receives supply of reactant gas to generate power;
   a fuel cell cooling system configured to circulate a coolant through the fuel cell to cool the fuel cell;
   an electric heater operated to consume power of the fuel cell; and
   a heater cooling system configured to circulate the coolant around the electric heater to cool the electric heater,
wherein the control method comprises:
   driving the electric heater to decrease power consumption by the electric heater abruptly when a temperature of the coolant in the heater cooling system is within a temperature range that is lower than a decomposition temperature of the coolant, and
   when the temperature of the coolant in the heater cooling system falls within the temperature range that is lower than the decomposition temperature of the coolant, perform circulating the coolant from the fuel cell cooling system into the heater cooling system to cool the electric heater.

8. The fuel cell system according to claim 1, wherein the controller is programmed to determine that the temperature of the coolant in the heater cooling system falls within the temperature range when the temperature of the coolant in the heater cooling system is equal to or higher than a predetermined threshold.

* * * * *